Nov. 17, 1936. W. J. FOSTER 2,060,983
WINDSHIELD WIPER ARM
Filed Aug. 21, 1933
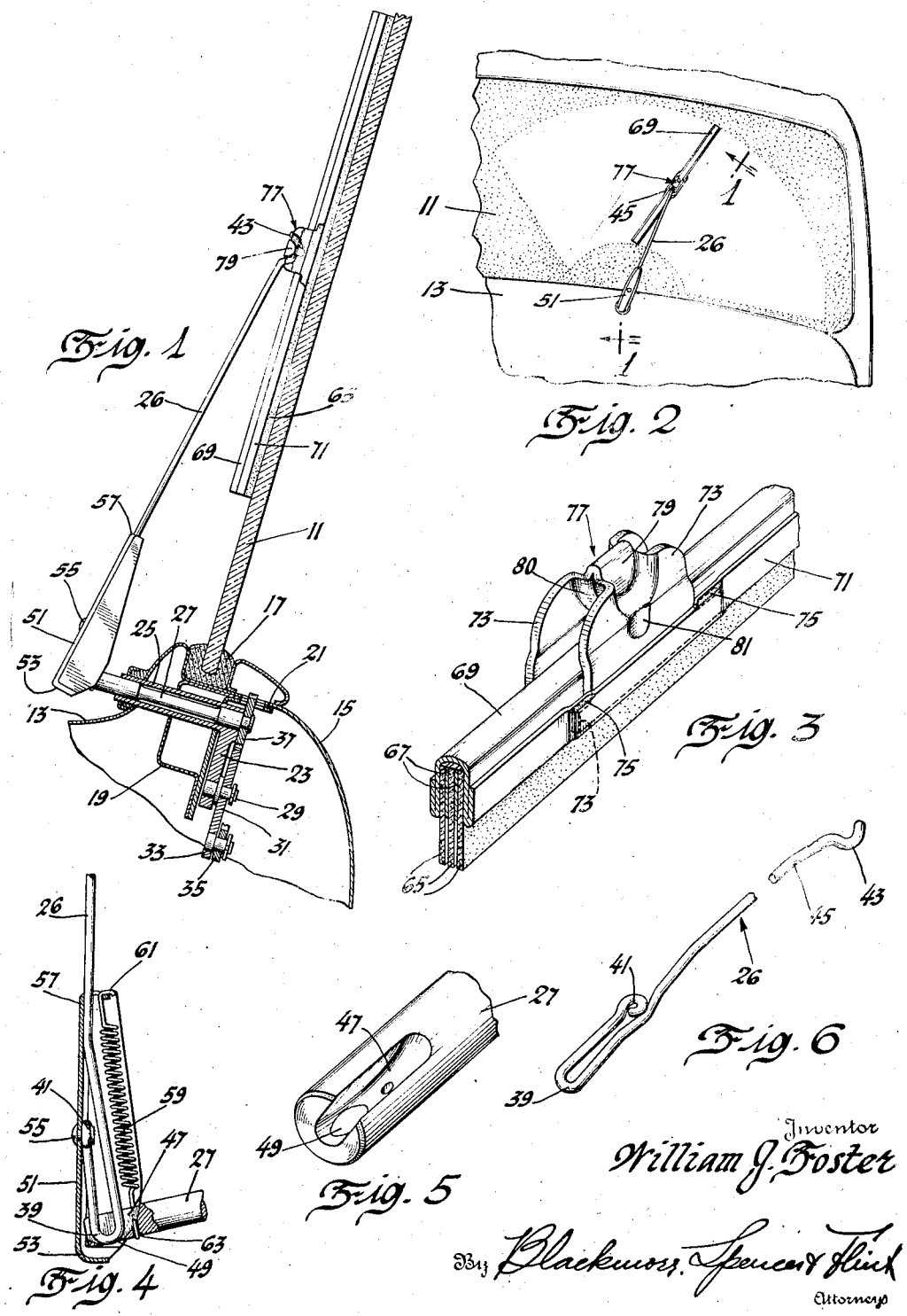
Inventor
William J. Foster
By Blackmore, Spencer & Flint
Attorneys Patented Nov. 17, 1936

2,060,983

UNITED STATES PATENT OFFICE 2,060,983

WINDSHIELD WIPER ARM

William J. Foster, Flint, Mich., assignor, by mesne assignments, to General Motors Corporation, Detroit, Mich., a corporation of Delaware Application August 21, 1933, Serial No. 686,048

4 Claims. (Cl. 15—255)

This invention relates to windshield cleaners.

An object of the invention is to provide an improved assembly of rockshaft arm and cleaner blade.

A further object is to produce such assembly which shall be efficient in service and economical to manufacture.

Other objects and advantages will be understood from the following description.

In the drawing accompanying this description Fig. 1 is a transverse section through a vehicle windshield showing my novel assembly associated therewith, this view being taken on line 1—1 of Fig. 2.

Fig. 2 is a front elevation of the windshield with my invention applied thereto.

Fig. 3 is a perspective of the blade, holder, and attaching clip.

Fig. 4 is a view in elevation, partly broken away and in section, showing the connection between the arm, the arm holder, and the rockshaft.

Fig. 5 is a perspective of the end of the rockshaft.

Fig. 6 is a perspective of the arm, detached.

Referring by reference characters to the drawing, numeral 11 represents a windshield of a motor vehicle. Its position relative to the cowl 13 and the instrument board 15 is shown by Fig. 1. The windshield is supported above a base 17 located between the parts 13 and 15 as shown. Beneath the base 17 is a hollow transverse box-like member 19. This member extends transversely as will be understood from an inspection of Fig. 1.

Suitably mounted beneath extensions 21 of the box 19 is a bracket 23 having a tubular extension 25 within which is journaled a shaft 27. This shaft extends from a point beneath the instrument board forwardly and through the part 13, and to its end is secured the arm of the cleaner assembly to be described below. One or more of such shafts 27 may be used, depending upon whether one or more cleaner elements are made use of. The drawing shows one such shaft near one end of the windshield. In the event that two are used the second will be located near the other end of the windshield as is customary.

The invention is not concerned with the operating mechanism. There are shown, however, means to rock shaft 27. On bracket 23 is a pivot pin 29 which rotatably supports a gear segment 31. The gear segment includes an arm 33 to a pin on which is pivotally connected a link 35. The reciprocating movements of the link may be produced by any desired operating mechanism, and these reciprocating movements serve to rock the segment 31. The teeth of the segment mesh with the teeth of a pinion 37 mounted on shaft 27.

The cleaner arm takes the form of a rod 26 shaped as shown in Fig. 6. Near one end the rod is bent as at 39 to form a long leg and a short leg. The shorter leg is formed with an eye 41. At the end of the long leg is a hook 43 near which as at 45 the rod is bent from the line of extent of its major portion. This bend is provided so that the blade end of the rod may extend in a horizontal direction when at the end of its stroke, at which time the major part of the rod does not quite reach the horizontal position. In this way the blade on the end of the arm may be parked out of the line of vision of the operator.

The part 39 of the arm enters and rocks in an elongated groove 47 at the end of shaft 27. At 49 this groove is shown as cut through the material of the shaft, this aperture serving to receive and locate the extreme end of the part 39 of the rod as shown in Fig. 4. There is thus determined a pivot point for the arm as it swings in the groove.

At 51 is a cover of substantially U-shape in cross section. The cover has a closed end 53 surrounding the end of shaft 27. The eye 41 of the arm is secured to the cover as by a rivet 55 or other suitable attaching means. The long leg of the arm extends through the cover and beyond its open end as at 57. A spring 59 is secured at its ends to the cover as at 61 and to the shaft 27 as at 63. In this way the part 39 of the arm is held firmly in the opening 49 of the groove 47, thus providing a definite fulcrum for the arm. The elongated dimension of the groove permits the spring 59 to rock the arm clockwise (Fig. 4) about its pivot at 49 to thereby hold the blade, which is carried on the end of the arm, firmly against the windshield.

The blade comprises a holder and one or a plurality of wiping elements 65 and spacing means 67. The blade holder is designated by numeral 69. It is of U-shape in section and serves to clamp the wiper elements and spacers. The extremities of its side walls are bent back as at 71 to thereby stiffen the holder. A U-shaped attaching member or clip 73 is employed to connect the blade holder to the arm. The side walls of the clip 73 lie adjacent the side walls of the holder and are gripped by the bent-over ends 75 as shown. The attaching member is thus held firmly in engagement with the holder. The side walls of the clip 73 are connected by a short bridge portion 77 under which is received the hooked end 43 of the arm as shown in Fig. 1. These side walls are pinched as at 79 to provide an efficient bearing surface 80 for the engagement of the hook 73. Furthermore there are pressed in regions 81 which engage the side walls of the hook and guide it, to the end of minimizing any tendency of the blade and holder to flop at its connection with the arm. There are thus three regions of contact to prevent or minimize any undesired blank movement.

The operation will be obvious upon inspection. As the shaft 27 rocks to and fro the wiper elements clean the region of the windshield shown as cleared on Fig. 2. Spring 59 holds the part 39 of the arm firmly in the opening 49 and also exerts a force tending to rock the arm in such a direction as to hold the wiper firmly yet resiliently against the glass. The tendency of the blade to flop about its connection with the arm as it sweeps in opposite directions is minimized by the portions 81 of the member 77. Also, the walls 80 of the clip formed by the pinched portions 79 afford an efficient bearing for the curved part of the hook 43.

I claim:

1. For use in cleaning a windshield, a rockshaft, an arm, a blade carried by one end of said arm, said rockshaft having at one end an axially elongated groove with an axially elongated bottom wall, the other end of said arm swingingly mounted in said groove and engaging the bottom wall thereof, a cover member secured to said arm and covering the end of said rockshaft, yielding means operably connected to said rockshaft and cover so positioned as to rock said arm together with its swingingly mounted end in the radial plane of the groove and in a direction to cause the blade to contact the windshield.

2. The invention defined by claim 1, said groove formed with an opening to serve as a pivot center for the movements of the arm, said yielding means operable to hold said arm in said opening.

3. The invention defined by claim 1, said arm comprising a rod having a U-shaped bend at said other end thereof with the bend located in said groove, one leg of said U-shaped bend being connected to said cover, the other leg of said bend being elongated and carrying the blade.

4. For use in cleaning a windshield, a rockshaft, an arm, a blade carried by one end of said arm, said rockshaft having at one end an axially elongated groove with an axially elongated bottom wall, the other end of said arm swingingly mounted in said groove and engaging the bottom wall thereof, yielding means operably connecting said rockshaft and arm so positioned as to rock said arm in the plane of the groove and in a direction to cause the blade to contact the windshield.

WILLIAM J. FOSTER.